US009477107B2

(12) United States Patent
Ono

(10) Patent No.: US 9,477,107 B2
(45) Date of Patent: Oct. 25, 2016

(54) LIQUID CRYSTAL DISPLAY DEVICE

(71) Applicant: NLT Technologies, Ltd., Kanagawa (JP)

(72) Inventor: Shin-Ichirou Ono, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 14/430,116

(22) PCT Filed: Sep. 20, 2013

(86) PCT No.: PCT/JP2013/075582
§ 371 (c)(1),
(2) Date: Mar. 20, 2015

(87) PCT Pub. No.: WO2014/046266
PCT Pub. Date: Mar. 27, 2014

(65) Prior Publication Data
US 2015/0248037 A1 Sep. 3, 2015

(30) Foreign Application Priority Data
Sep. 21, 2012 (JP) .................................. 2012-208858

(51) Int. Cl.
*G02F 1/1333* (2006.01)
(52) U.S. Cl.
CPC ............... *G02F 1/133308* (2013.01); *G02F 2001/133314* (2013.01); *G02F 2201/46* (2013.01)
(58) Field of Classification Search
CPC ........... G02F 2001/133314; G02F 1/133308; G02F 2001/133317; G02F 2001/133322
USPC .......................................................... 349/58
See application file for complete search history.

(56) References Cited

U.S. PATENT DOCUMENTS

2002/0075425 A1 6/2002 Yoshino
2009/0153769 A1* 6/2009 Lao .................. G02F 1/133308
  349/58
2010/0265426 A1* 10/2010 Jeon .................. G02F 1/133308
  349/58

FOREIGN PATENT DOCUMENTS

| JP | 2002-107697 A | 4/2002 |
| JP | 2002-268063 A | 9/2002 |
| JP | 2002268063 A * | 9/2002 |
| JP | 2004-030248 A | 1/2004 |
| JP | 2008-257953 A | 10/2008 |

OTHER PUBLICATIONS

International Search Report for PCT/JP2013/075582 dated Dec. 3, 2013.

* cited by examiner

Primary Examiner — Lucy Chien
(74) Attorney, Agent, or Firm — Sughrue Mion, PLLC

(57) ABSTRACT

A liquid crystal display device includes: a chassis in which a liquid crystal panel and a reflection sheet are placed; a rear case attached to a back face of the chassis where a part of the reflection sheet is exposed; and a signal processing substrate that is placed on the reflection sheet and that is used for driving the liquid crystal panel. A positioning mount component is mounted on the signal processing substrate, a positioning pin capable of locking the positioning mount component is formed at a position corresponding to the positioning mount component in the rear case, and the positioning mount component is fitted to the corresponding positioning pin to thereby position the signal processing substrate at a desired position on the reflection sheet.

9 Claims, 10 Drawing Sheets

FIRST EMBODIMENT

FIRST EMBODIMENT

FIRST EMBODIMENT

THIRD EMBODIMENT

THIRD EMBODIMENT

LIQUID CRYSTAL DISPLAY DEVICE

CROSS REFERENCE TO RELATED APPLICATIONS

This application is a National Stage of International Application No. PCT/JP2013/075582 filed Sep. 20, 2013, claiming priority based on Japanese Patent Application No. 2012-208858, filed Sep. 21, 2012, the contents of all of which are incorporated herein by reference in their entirety.

TECHNICAL FIELD

The present invention relates to liquid crystal display devices. Furthermore, the present invention relates to a liquid crystal display device in which a signal processing substrate equipped with a drive circuit for driving a liquid crystal panel is placed on a reflection sheet.

BACKGROUND ART

In conventional liquid crystal display devices, a signal processing substrate in a liquid crystal module is placed on the outer surface (back surface) of a rear case, and a substrate cover is typically attached to the rear case to thereby protect the signal processing substrate. An example thereof is disclosed in Patent Literature 1 (see FIG. 1 to FIG. 4, paragraphs 0016 to 0031).

In the liquid crystal display device of Patent Literature 1, the back surface (rear surface) of a reflection plate (reflection sheet) is covered with a housing (rear case), and a signal processing substrate is attached to the outer surface of the housing. In order to protect the signal processing substrate, a substrate cover is attached to the housing so as to cover the signal processing substrate. The signal processing substrate is fixed using nails. In other words, the outer surface of the housing is provided with the plural nails, and the signal processing substrate is locked with the nails to be thereby fixed on the outer surface of the housing.

It will be appreciated that means for fixing a signal processing substrate is not limited to nails. A conventional example in which a signal processing substrate is fixed using members other than the nails is illustrated in FIG. 8 and FIG. 9.

FIG. 8 is an exploded perspective view of the principal part of a general method for attaching a signal processing substrate in a conventional liquid crystal display device, and FIG. 9 is a partial cross-sectional view of an assembled state taken along the line D-D of FIG. 8.

As illustrated in FIG. 8 and FIG. 9, the whole back face of a rectangular frame-shaped chassis 110 including a liquid crystal panel and a backlight device (none of both of which is illustrated) is covered with a rear case 115 having a generally rectangular shape, and a signal processing substrate 116 is fixed on the outer surface of the rear case 115 using two positioning pins 114 and a screw 120. In other words, two positioning holes 116a and a threaded insertion hole 116b are formed at positions, illustrated in FIG. 8, in the signal processing substrate 116, and two positioning pins 114 and a threaded hole 121 are formed at corresponding positions in the outer surface of the rear case 115. When the signal processing substrate 116 is fixed, the two positioning pins 114 of the rear case 115 are fitted into the two positioning holes 116a in the signal processing substrate 116, respectively, to thereby position the signal processing substrate 116 at a predetermined position, and the screw 120 is then inserted into the threaded insertion hole 116b and put into the threaded hole 121.

In FIG. 9, in order to simplify the drawing, only a reflection sheet 112 and a light guide plate 111 are illustrated as components in the interior of the chassis 110, and the other components are omitted. The reflection sheet 112 is the component present in the outermost side (backmost portion) in the interior of the chassis 110 and is exposed to the back face of the chassis 110. The reflection sheet 112 is adhesively bonded to the back surface of the light guide plate 111.

CITATION LIST

Patent Literature

Patent Literature 1: Japanese Patent Laid-Open No. 2004-030248

SUMMARY OF THE INVENTION

Technical Problem

The conventional liquid crystal display device illustrated in FIG. 8 and FIG. 9 has a problem that the liquid crystal module and, in turn, the overall thickness of the liquid crystal display device become large since the rear case 115 is put on the whole back face of the chassis 110, the signal processing substrate 116 is fixed on the outer surface of the rear case 115, and a substrate cover 122 is further put thereon. A conceivable manner for solving this problem includes removing a part, in which the signal processing substrate 116 is placed, of the rear case 115, to place the signal processing substrate 116 on the reflection sheet 112. However, in this case, another problem occurs that it is difficult to dispose the positioning pin 114 for positioning the signal processing substrate 116. This point will be explained with reference to FIG. 10.

FIG. 10 is an explanatory plan view illustrating a structure in which the part, in which the signal processing substrate 116 is placed, of the rear case 115 is removed to expose the reflection sheet 112 in the conventional liquid crystal display device illustrated in FIG. 8. As illustrated in the drawing above, the width of the rear case 115 is decreased, a region including the part, in which the signal processing substrate 116 is placed, of the rear case 115 is opened, and the reflection sheet 112 is exposed from the opened region. When the signal processing substrate 116 is placed and fixed on the reflection sheet 112 through the opened region in this state, a threaded hole 121 and a positioning pin 114 present on the same side as a side in which the threaded hole 121 is formed can be disposed in a side wall 110a of a chassis 110. However, since the signal processing substrate 116 is shorter than the distance between the side walls 110a of the chassis 110, the positioning pin 114 opposite to the threaded hole 121 can be disposed on none of the chassis 110 and the rear case 115.

When the positioning pin 114 opposite to the threaded hole 121 is omitted to make only the positioning pin 114 on the same side as the side in which the threaded hole 121 is present, the signal processing substrate 116 is easily swung (displaced) around the positioning pin 114 on the side wall 110a as indicated by the arrow X in FIG. 10. Therefore, the positional displacement of the signal processing substrate 116 easily occurs, and it becomes difficult to position the signal processing substrate 116 at a predetermined position. As a result, various problems occurs that the threaded insertion hole 116b of the signal processing substrate 116 does not match the threaded hole 121 of the chassis 110, it is difficult to tighten a screw 120, a connection portion 113a in an FPC 113 is not able to be inserted into a connector 118 in the signal processing substrate 116, and the contact between the connection portion 113a and the connector 118 in the FPC 113 becomes poor.

In other words, when the positioning pin 114 that can be formed is only one, it is impossible to secure the accuracy of positioning the signal processing substrate 116 at a desired level, and degradation problems such as the positional deviation of the signal processing substrate 116, and poor assembly occur. Thus, a manner for avoiding such problems is required in order to place the signal processing substrate 116 on the reflection sheet 112.

The present invention was accomplished in consideration of such circumstances as mentioned above. An objective of the present invention is to provide a liquid crystal display device of which the overall thickness can be reduced while securing the accuracy of positioning a signal processing substrate when the signal processing substrate is placed on a reflection sheet exposed from a rear case.

Another objective of the present invention is to provide a liquid crystal display device in which a frame region can be further narrowed.

The other objectives of the present invention, which are not clearly described in the description, are clear from the following explanations and attached drawings.

Solution to Problem (1) A liquid crystal display device of the present invention includes:

a chassis in which a liquid crystal panel and a reflection sheet are placed;

a rear case attached to a back face of the chassis in a state in which a part of the reflection sheet is exposed; and a signal processing substrate that is placed on the reflection sheet exposed from the rear case and that is used for driving the liquid crystal panel;

wherein one or two or more positioning mount components are mounted on the signal processing substrate; one or two or more locking portions (for example, a pin, a projection, a depression, or a hole) capable of locking the positioning mount components are formed at positions corresponding to the positioning mount components in the rear case; and the positioning mount components are locked at the corresponding locking portion to thereby position the signal processing substrate at a desired position on the reflection sheet.

In the liquid crystal display device of the present invention, the signal processing substrate is placed on the reflection sheet exposed from the rear case, and therefore, the protrusion height of the signal processing substrate is low, compared to a case in which the signal processing substrate is placed on the rear case, so that the height of a liquid crystal module is low.

Since the positioning mount components mounted on the signal processing substrate are locked at the locking portions formed at positions corresponding to the positioning mount components on the rear case, the positions of the positioning mount components and the locking portions can be easily matched with each other by adjusting the shapes or mounting positions of the positioning mount components even if the signal processing substrate is in the state of not directly overlapping the rear case. Therefore, the signal processing substrate can be positioned at a desired position on the reflection sheet even when the signal processing substrate is placed on the reflection sheet exposed from the rear case.

As described above, in the liquid crystal display device of the present invention, the overall thickness of the liquid crystal display device can be decreased while securing the accuracy of positioning the signal processing substrate when the signal processing substrate is placed on the reflection sheet exposed from the rear case.

In a case in which the number of the positioning mount components mounted on the signal processing substrate is one, for example, it is necessary to lock the positioning mount component at the locking portion and, in addition, to lock the positioning portion (for example, a hole or a projection), which is directly formed on the signal processing substrate, at the locking portion (for example, a projection or a hole) formed in the chassis. This is because only locking of the one positioning mount component at the one corresponding locking portion does not result in desired positioning accuracy.

In contrast, such an operation as described above is unnecessary when the number of the positioning mount components mounted on the signal processing substrate is two or more. This is because only locking of the two or more positioning mount components at the two or more corresponding locking portions results in the desired positioning accuracy.

(2) In the preferred example of the liquid crystal display device of the present invention, parts of the positioning mount components protrude along the signal processing substrate from an outer periphery of the signal processing substrate, such protrusions overlap the rear case, and the positioning mount components are locked at the corresponding locking portions in places in which the protrusions overlap the rear case.

(3) In another preferred example of the liquid crystal display device of the present invention, the whole positioning mount components are placed in an internal side from the outer periphery of the signal processing substrate, a protrusion of the rear case overlaps the signal processing substrate in the internal side from the outer periphery of the signal processing substrate, and the positioning mount components are locked at the corresponding locking portions in a place in which the protrusion of the rear case overlaps the signal processing substrate.

(4) In still another preferred example of the liquid crystal display device of the present invention, the positioning mount components are plates in which positioning holes are formed, and the locking portions are pins or projections that can be fitted into the positioning holes.

(5) In still another preferred example of the liquid crystal display device of the present invention, the positioning mount components are metallic plates, in which positioning holes are formed, and are mounted on the signal processing substrate by soldering or adhesive bonding.

(6) In still another preferred example of the liquid crystal display device of the present invention, the positioning mount components are mounted across a gap between the signal processing substrate and the rear case.

(7) In still another preferred example of the liquid crystal display device of the present invention, the positioning mount components are mounted across a cutout portion formed in the signal processing substrate.

(8) In still another preferred example of the liquid crystal display device of the present invention, one of the locking portions formed in the rear case is formed in a first protrusion formed in the rear case, other one of the locking portions formed in the rear case is formed in a second protrusion formed in the rear case, and the second protrusion includes a part extending along a side wall of the chassis.

(9) In still another preferred example of the liquid crystal display device of the present invention, further including a substrate cover including an inwardly protruding projection, wherein the substrate cover is placed so as to press the positioned signal processing substrate with the projection, whereby the signal processing substrate is fixed without using any screw.

Advantageous Effects of Invention

According to the liquid crystal display device of the present invention, there is provided the effect of making it possible to decrease the overall thickness while securing the accuracy of positioning the signal processing substrate when the signal processing substrate is placed on the reflection sheet exposed from the rear case.

There is further provided the effect of making it possible to narrow a frame region when the two or more positioning mount components are mounted on the signal processing substrate, and each of the positioning mount components is locked at each of the two or more locking portions formed at positions corresponding to the positioning mount components on the rear case.

DESCRIPTION OF EMBODIMENTS

Preferred embodiments of the present invention will be explained in detail below with reference to the attached drawings.

First Embodiment

Figure 1:
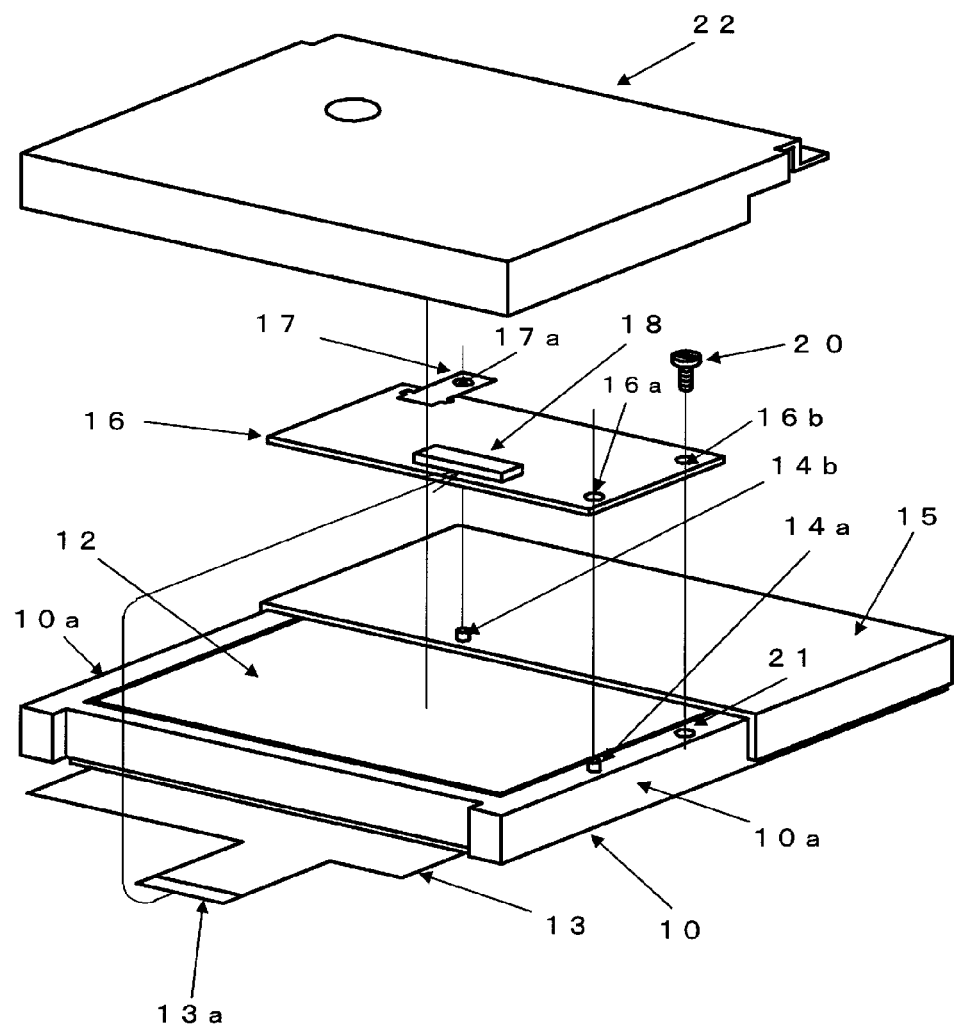
FIG. 1 is an exploded perspective view of a principal part, illustrating the structure of a liquid crystal display device according to a first embodiment of the present invention.
Figure 2:
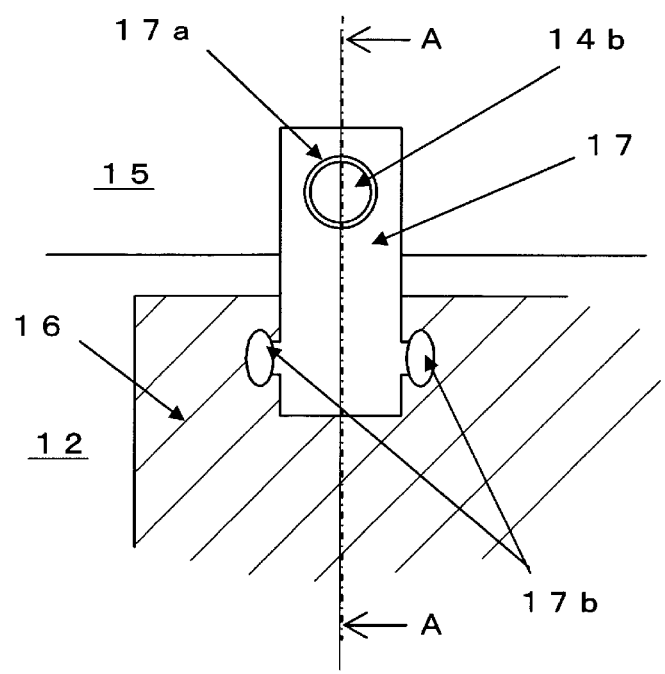
FIG. 2 is a partial plan view illustrating a mechanism for positioning a signal processing substrate in the liquid crystal display device according to the first embodiment of the present invention.
Figure 3:
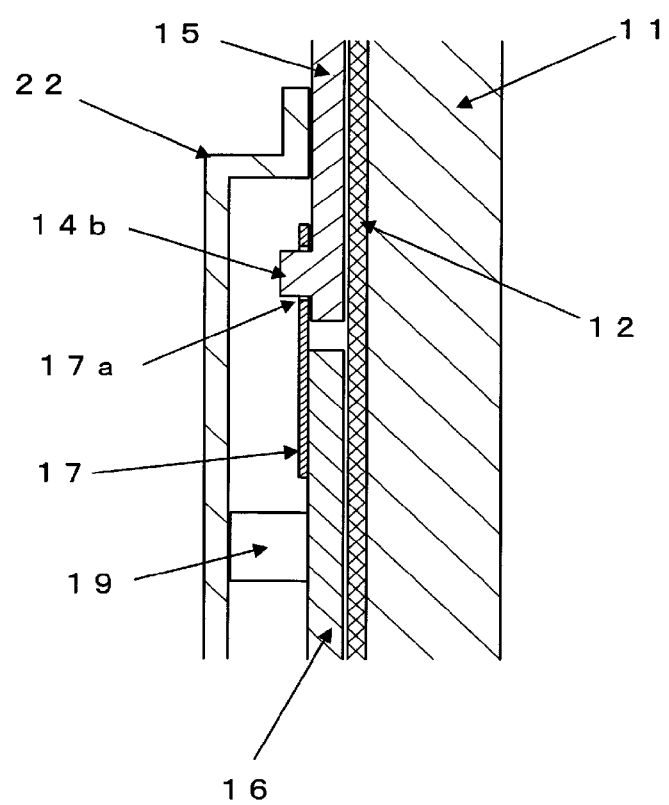
FIG. 3 is a partial cross-sectional view of the liquid crystal display device according to the first embodiment of the present invention, taken along the line A-A of FIG. 2.

The structure of the liquid crystal display device according to the first embodiment of the present invention is illustrated in FIG. 1 to FIG. 3.

In the liquid crystal display device of the first embodiment, a liquid crystal module includes a chassis 10 having a rectangular frame shape, in which a liquid crystal panel and a backlight device (neither of which is illustrated) are placed, as illustrated in FIG. 1. A rear case 15 having a generally rectangular shape is attached to the back face of the chassis 10 so as to cover approximately one-half of the back face, and a reflection sheet 12 placed in the chassis 10 is exposed into a region in which the rear case 15 does not exist. A signal processing substrate 16 having a generally rectangular shape is placed and fixed on the portion of the reflection sheet 12, exposed from the rear case 15.

A substrate cover 22 having a generally rectangular shape is further attached to the back face of the chassis 10 so as to cover the region in which the rear case 15 does not exist. The signal processing substrate 16 and the reflection sheet 12 are protected in such a manner. The substrate cover 22 is fixed to the backlight device by fitting nails, which are not illustrated, to each other or by screwing.

An FPC 13, of which one end is connected to the liquid crystal panel, extends from one side (left side in FIG. 1) of the chassis 10. A connection portion 13a in the leading end of the FPC 13 is connected to a connector 18 disposed on the signal processing substrate 16.

In this case, only the reflection sheet 12 and a light guide plate 11 are illustrated as components of the backlight device placed in the interior of the rear case 15, and the other components than the reflection sheet 12 and the light guide plate 11 are omitted. The reflection sheet 12 at a position closest to the rear case 15 is adhesively bonded to the back surface of the light guide plate 11 adjacent to the reflection sheet 12. An optical sheet group (such as a diffusion sheet) and the liquid crystal panel are placed at positions in the light guide plate 11, opposite to the reflection sheet 12.

The chassis 10 is typically formed of a rigid metallic material or resin material. The rear case 15 is also typically formed of a metallic material such as an aluminum alloy or a magnesium alloy and may also be formed of a resin material such as polypropylene.

The connector 18 is installed on the center of an end in the same side as that of the FPC 13 in the rectangular signal processing substrate 16, a circular positioning hole 16a and a threaded insertion hole 16b are further formed in the vicinity of one side, and a positioning mount component 17 is formed in the vicinity of the other side. The positioning hole 16a is used for positioning the signal processing substrate 16, and the threaded insertion hole 16b is used for screwing the signal processing substrate 16.

The positioning hole 16a is in the vicinity of a corner (in the front left in FIG. 1) that is in the same side as that of the connector 18 and opposite to the positioning mount component 17. The threaded insertion hole 16b is in the vicinity of a corner (in the back right in FIG. 1) that is opposite to the connector 18 and opposite to the positioning mount component 17. Both positions of the positioning hole 16a and the threaded insertion hole 16b are determined to overlap a corresponding side wall 10*a* (in the front in FIG. 1) of the chassis 10. The signal processing substrate 16 does not overlap the rear case 15 except the positioning mount component 17.

In the side wall 10*a* (in the front in FIG. 1) of the chassis 10, in the side overlapped by the positioning hole 16*a* and the threaded insertion hole 16*b*, a cylindrical positioning pin 14*a* is formed at a position overlapping (corresponding) the positioning hole 16*a* of the signal processing substrate 16, and a threaded hole 21 is formed at a position overlapping (corresponding) the threaded insertion hole 16*b* of the signal processing substrate 16. The positioning hole 16*a* fits the positioning pin 14*a* just under the positioning hole 16*a*. The threaded insertion hole 16*b* overlaps the threaded hole 21 just under the threaded insertion hole 16*b*, and a screw 20 inserted from above the threaded insertion hole 16*b* is put into the threaded hole 21. The signal processing substrate 16 is fixed on the reflection sheet 12 in such a manner.

In the signal processing substrate 16, the positioning mount component 17 including a belt-shaped (tongue-shaped) metal plate is mounted in the vicinity of one corner (in the back right in FIG. 1) opposite to the connector 18, as clearly illustrated in FIG. 2. The positioning mount component 17 protrudes along the side wall 10*a* of the chassis 10 from the outer periphery of the signal processing substrate 16. The protrusion of the positioning mount component 17 is outside the outer periphery of the signal processing substrate 16 and partially overlaps the rear case 15.

The end of the positioning mount component 17 is fixed to the surface of the signal processing substrate 16 by soldering, and a circular positioning hole 17*a* is formed in its leading end that protrudes from the outer periphery of the signal processing substrate 16. The positioning hole 17*a* overlaps the rear case 15.

In FIG. 2, reference numeral 17*b* denotes a portion (solder portion) in which the positioning mount component 17 is soldered to the signal processing substrate 16. In this case, two solder portions 17*b* in total are disposed on both sides of the positioning mount component 17. It will be appreciated that a method for fixing the positioning mount component 17 to the signal processing substrate 16 is not limited to soldering but may be another method such as adhesive bonding with an adhesive.

A cylindrical positioning pin 14*b* is formed at a position corresponding to (overlapping) the positioning hole 17*a* of the positioning mount component 17 on the outer surface of the rear case 15. The positioning hole 17*a* is fitted to the positioning pin 14*b*. This state is clearly illustrated in FIG. 3.

As illustrated in FIG. 3, the rear case 15 is attached to the chassis 10 in a state in which the inner surface of the rear case 15 is brought close to the outer surface of the reflection sheet 12. The signal processing substrate 16 is put on the outer surface of the reflection sheet 12. A small gap is formed between the ends, facing each other, of the signal processing substrate 16 and the rear case 15. The positioning mount component 17 disposed on the signal processing substrate 16 is placed across the gap, and the positioning hole 17*a* of the positioning mount component 17 is fitted to the positioning pin 14*b* on the rear case 15. Since the thickness of the signal processing substrate 16 is approximately equal to the thickness of the rear case 15, the fitting is easily achieved only by attaching the flat belt-shaped (tongue-shaped) positioning mount component 17 to a desired place on the signal processing substrate 16.

In FIG. 3, reference numeral 19 denotes an electrical mount component carried on the signal processing substrate 16. In a case in which a space, in which the positioning mount component 17 is attached, exists between the end, closer to the rear case 15, of the signal processing substrate 16 and the electrical mount component 19, change of the layout of the electrical mount component 19 and other similar components due to the positioning mount component 17 is not needed. However, when such a space does not sufficiently exist, the change of the layout of the electrical mount component 19 and the like is needed.

Figure 10:
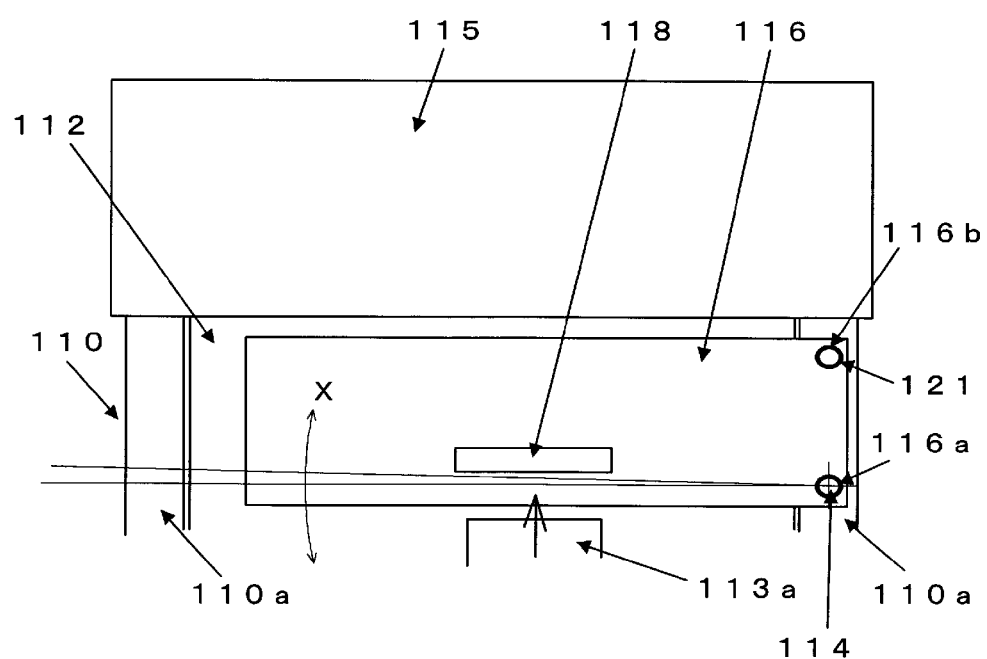
FIG. 10 is a plan explanatory view illustrating a state in which the signal processing substrate is fixed when a signal processing substrate is placed on a reflection sheet exposed from a rear case in the conventional liquid crystal display device illustrated in FIG. 8.

As described above, the signal processing substrate 16 placed on the reflection sheet 12 is positioned accurately at the desired position by fitting the two positioning holes 17*a* and 16*a* to the positioning pin 14*b* on the rear case 15 and the positioning pin 14*a* on the side wall 10*a* of the chassis 10, respectively. Rotational displacement, as in a case in which a positioning pin is allowed to be one (see FIG. 10), does not occur. In addition, the positioned signal processing substrate 16 is fixed to the position using the screw 20.

The step of assembling the liquid crystal display device according to the first embodiment with such a structure as described above will be explained below.

First, the liquid crystal panel and the backlight device are incorporated into the interior of the chassis 10, and the rear case 15 is then attached to the back face of the chassis 10, opposite to the FPC 13 extending from the chassis 10. In this case, the reflection sheet 12 of the backlight device is exposed from the opening (a region that is not covered with the rear case 15) of the chassis 10.

Then, the signal processing substrate 16 on which the positioning mount component 17 is pre-mounted is put on the outer surface of the exposed reflection sheet 12 through the opening of the back face of the chassis 10. In this case, the positioning hole 17*a* of the positioning mount component 17 and the positioning hole 16*a* of the signal processing substrate 16 are fitted to the positioning pin 14*b* on the rear case 15 and the positioning pin 14*a* on the side wall 10*a* top of the chassis 10, respectively. In such a manner, the signal processing substrate 16 is automatically positioned at the predetermined position on the reflection sheet 12.

In this case, since the signal processing substrate 16 is automatically positioned at the predetermined position, the threaded insertion hole 16*b* of the signal processing substrate 16 overlaps the threaded hole 21 on the chassis 10, and displacement hardly occurs. Thus, the screw 20 may be inserted into the threaded insertion hole 16*b* from above the threaded insertion hole 16*b* and put into the threaded hole 21. In this case, any trouble does not occur when the screw 20 is put. In such a manner, the signal processing substrate 16 can be reliably fixed to the desired position.

Then, the connection portion 13*a* of the leading end of the FPC 13 is curved toward the rear case 15 and connected to the connector 18 on the fixed signal processing substrate 16. Since the signal processing substrate 16 is fixed at the predetermined position, any trouble does not also occur when the connection portion 13*a* is connected to the connector 18 in this case.

Finally, the substrate cover 22 is attached to the chassis 10 so as to cover the region (opening) that is not covered with the rear case 15 in the back face of the chassis 10, to protect the signal processing substrate 16 and the reflection sheet 12. In such a manner, the assembly step from the attaching of the rear case 15 to the attaching of the substrate cover 22 is completed.

As mentioned above, in the liquid crystal display device according to the first embodiment of the present invention, the approximate half of the rear case 15 attached to the back face of the chassis 10 is cut out, the signal processing substrate 16 is placed and fixed on the reflection sheet 12 exposed from the rear case 15, and therefore, the projecting height of the signal processing substrate 16 is decreased by a level equivalent to the thickness of the rear case 15, compared to a case in which the signal processing substrate 16 is placed on the rear case 15, so that the thickness of the liquid crystal module is decreased.

The positioning mount component 17 having the positioning hole 17a is protruded toward the rear case 15 and mounted on the signal processing substrate 16, the positioning hole 16a is formed at a position overlapping one side wall 10a of the chassis 10 in the signal processing substrate 16, the positioning pins 14b and 14a corresponding to the positioning holes 17a and 16a are further disposed on the rear case 15 and the side wall 10a of the chassis 10, respectively, and therefore, the signal processing substrate 16 is reliably positioned at the desired position on the reflection sheet 12 by fitting the positioning holes 17a and 16a to the positioning pins 14b and 14a, respectively. In other words, the accuracy of positioning the signal processing substrate 16 is secured.

As described above, in the liquid crystal display device according to the first embodiment of the present invention, there is provided the effect of making it possible to reduce the overall thickness of the liquid crystal module or, in turn, the liquid crystal display device while securing the desired accuracy of positioning the signal processing substrate 16.

Since the positioning mount component 17 can be mounted on the signal processing substrate 16 by an automatic mounting machine during the step of mounting another electronic component, increase in the number of steps of assembling the liquid crystal display device due to the addition of the positioning mount component 17 does not occur.

The one positioning mount component 17 is formed to protrude in the vicinity of the one side of the signal processing substrate 16 in the first embodiment; however, the number of positioning mount components 17 is not limited to one. If necessary, two (or three or more) positioning mount components 17 may be disposed. For example, two tongue-shaped positioning mount components 17 (having positioning holes 17a) as illustrated in FIG. 1 to FIG. 3 may be disposed at a spacing in the vicinity of one side of the signal processing substrate 16. In this case, it is necessary to form two positioning pins 14b, fitted into the positioning holes 17a of the positioning mount components 17, at corresponding positions on the rear case 15; however, since only two pairs of the positioning mount components 17 and the positioning pins 14b can result in desired positioning, the positioning hole 16a of the signal processing substrate 16 and the positioning pin 14a on the side wall 10a of the chassis 10 can be omitted.

Second Embodiment

Figure 4:
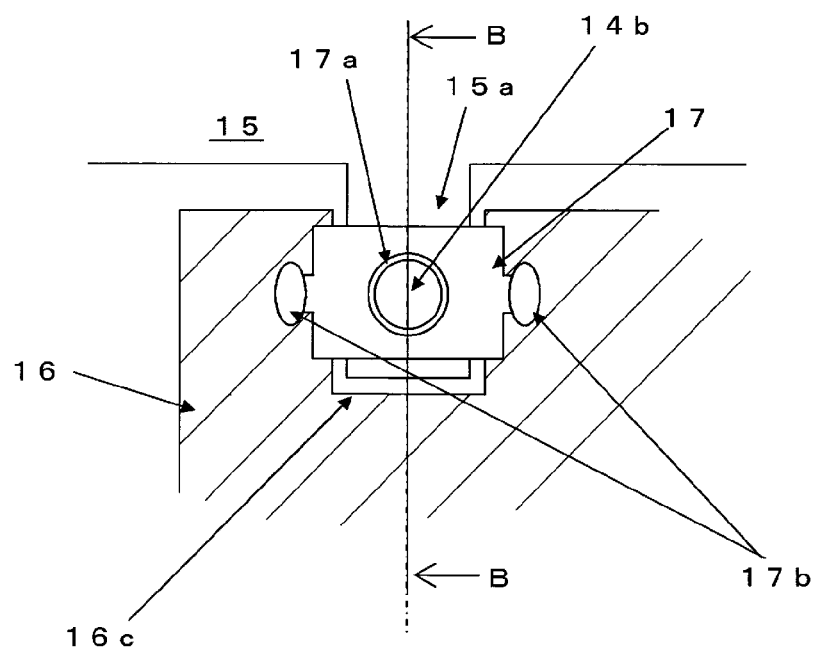
FIG. 4 is a partial plan view illustrating a mechanism for positioning a signal processing substrate in a liquid crystal display device according to a second embodiment of the present invention.
Figure 5:
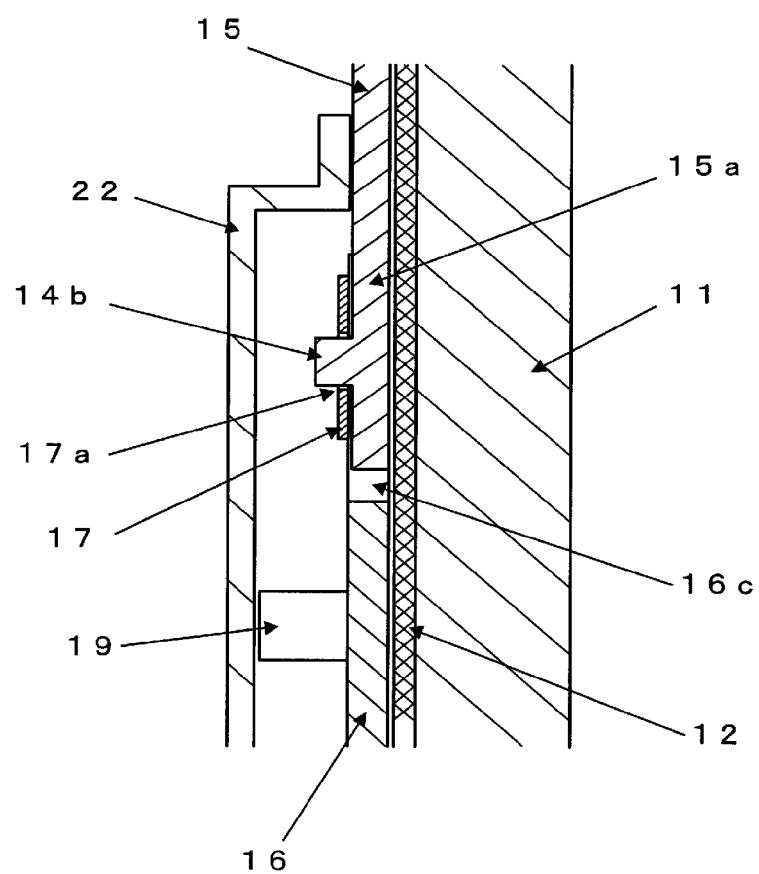
FIG. 5 is a partial cross-sectional view of the liquid crystal display device concerning the second embodiment of the present invention, taken along the line B-B of FIG. 4.

FIG. 4 and FIG. 5 illustrate a liquid crystal display device according to the second embodiment of the present invention.

The liquid crystal display device of the second embodiment differs from the liquid crystal display device of the first embodiment in that: (a) the end, closer to a rear case 15, of a signal processing substrate 16 is partially cut out to form a cutout portion (void) 16c having a generally rectangular shape; (b) a positioning mount component 17 (having a circular positioning hole 17a in its center) including a rectangular metal plate is mounted, across the cutout portion 16c, on the signal processing substrate 16; (c) a generally rectangular protrusion 15a that is fitted approximately into the cutout portion 16c is formed on the end, closer to an FPC 13, of the rear case 15; and (d) a cylindrical positioning pin 14b that is fitted approximately into the positioning hole 17a is formed on the protrusion 15a of the rear case 15. Thus, the differences are explained below. In the same structure as that of the liquid crystal display device of the first embodiment, the same reference numeral is applied to the same portion, to omit its explanation.

In the liquid crystal display device of the second embodiment, the cutout portion 16c is formed in the end of the signal processing substrate 16, and the positioning mount component 17 is fixed across the cutout portion 16c by solder portions 17b, as illustrated in FIG. 4 and FIG. 5. Thus, unlike the first embodiment mentioned above, the positioning mount component 17 does not protrude over the outer periphery of the signal processing substrate 16. The positioning mount component 17 exists inside the outer periphery of the signal processing substrate 16. As a result, there is no fear of deformation, breakage, or deletion of the positioning mount component 17 during transportation or handling of the signal processing substrate 16.

In correspondence to the cutout portion 16c of the signal processing substrate 16, the protrusion 15a is formed on the end, closer to the FPC 13, of the rear case 15, in the form of approximately fitting the cutout portion 16c. The positioning pin 14b is formed on the protrusion 15a rather than on the main body of the rear case 15.

When the signal processing substrate 16 on which the positioning mount component 17 is pre-mounted is put on the outer surface of an exposed reflection sheet 12 through an opening in the back face of a chassis 10, the positioning hole 17a in the positioning mount component 17 and a positioning hole 16a in the signal processing substrate 16 are fitted to the positioning pin 14b on the protrusion 15a of the rear case 15 and a positioning pin 14a on a side wall 10a of the chassis 10, respectively. In such a manner, the signal processing substrate 16 is automatically positioned at a predetermined position on the reflection sheet 12. In this case, as illustrated in FIG. 5, the positioning hole 17a in the positioning mount component 17 is fitted to the positioning pin 14b on the protrusion 15a in the rectangular outer periphery of the signal processing substrate 16.

As mentioned above, in the liquid crystal display device according to the second embodiment of the present invention, the height of the substrate cover 22 with respect to the chassis 10 can be decreased by a level equivalent to the thickness of the rear case 15 by a reason similar to that of the liquid crystal display device according to the first embodiment described above. In addition, the positioning pins 14b and 14a disposed at the corresponding positions, respectively, of the protrusion 15a of the rear case 15 and of the chassis 10 are fitted into the positioning holes 17a and 16a, respectively, to automatically position the signal processing substrate 16 at the desired position, and therefore, the accuracy of positioning the signal processing substrate 16 can be secured.

Thus, as in the case of the liquid crystal display device according to the first embodiment described above, there is provided the effect of making it possible to reduce the overall thickness of the liquid crystal module or, in turn, the liquid crystal display device while securing the accuracy of positioning the signal processing substrate 16 without increasing the number of steps of assembling the liquid crystal display device.

Further, there is also provided the effect of eliminating the fear of breaking the positioning mount component 17 in the steps of attaching, storing, and transporting the signal processing substrate 16 since the positioning mount component 17 does not protrude from the outer periphery of the signal processing substrate 16, in the liquid crystal display device according to the second embodiment.

In the second embodiment, two pairs of cutout portions (voids) 16c and positioning mount components 17 as illustrated in FIG. 4 to FIG. 5 may also be disposed at spacings in one side of the signal processing substrate 16, as in the case of the first embodiment described above. In this case, it is necessary to dispose two positioning pins 14b, each fitted into positioning holes 17a in the positioning mount components 17, on two protrusions 15a formed at corresponding positions on the rear case 15, respectively. In this case, since only two pairs of the positioning mount components 17 and the positioning pins 14b can also result in desired positioning, the positioning pin 14b on the side wall 10a of the chassis 10 can be omitted.

Third Embodiment

Figure 6:
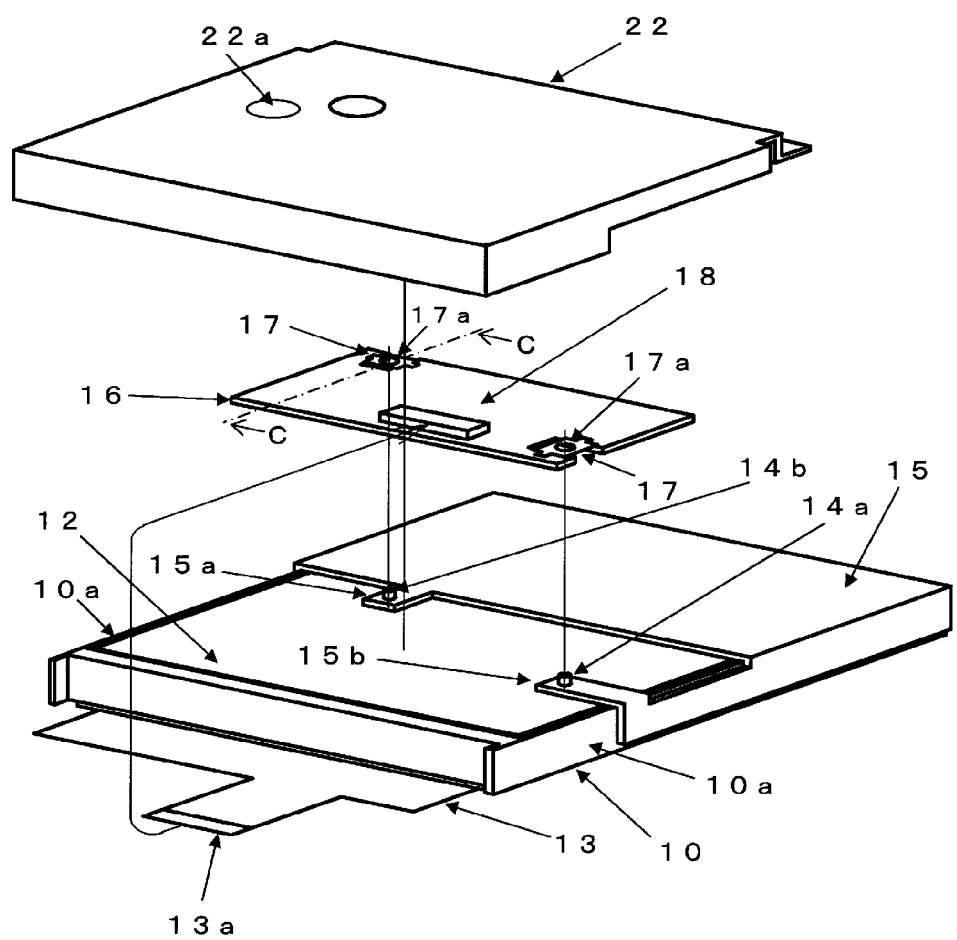
FIG. 6 is an exploded perspective view of a principal part, illustrating the structure of a liquid crystal display device according to a third embodiment of the present invention.
Figure 7:
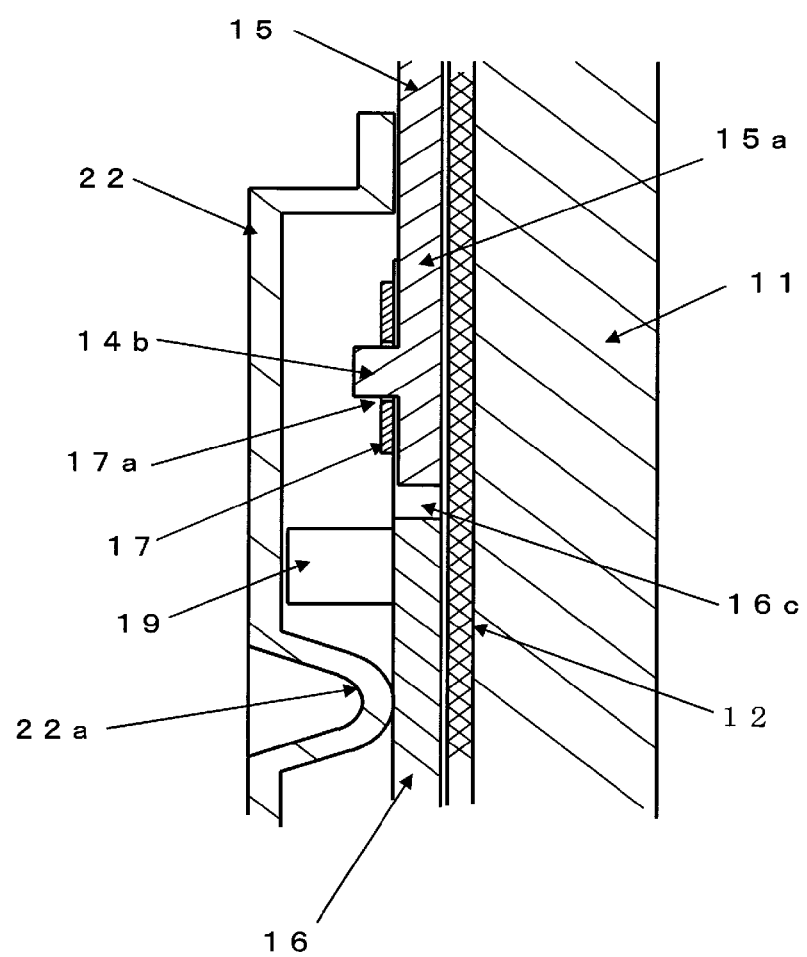
FIG. 7 is a partial cross-sectional view of the liquid crystal display device according to the third embodiment of the present invention, taken along the line C-C of FIG. 6.
Figure 8:
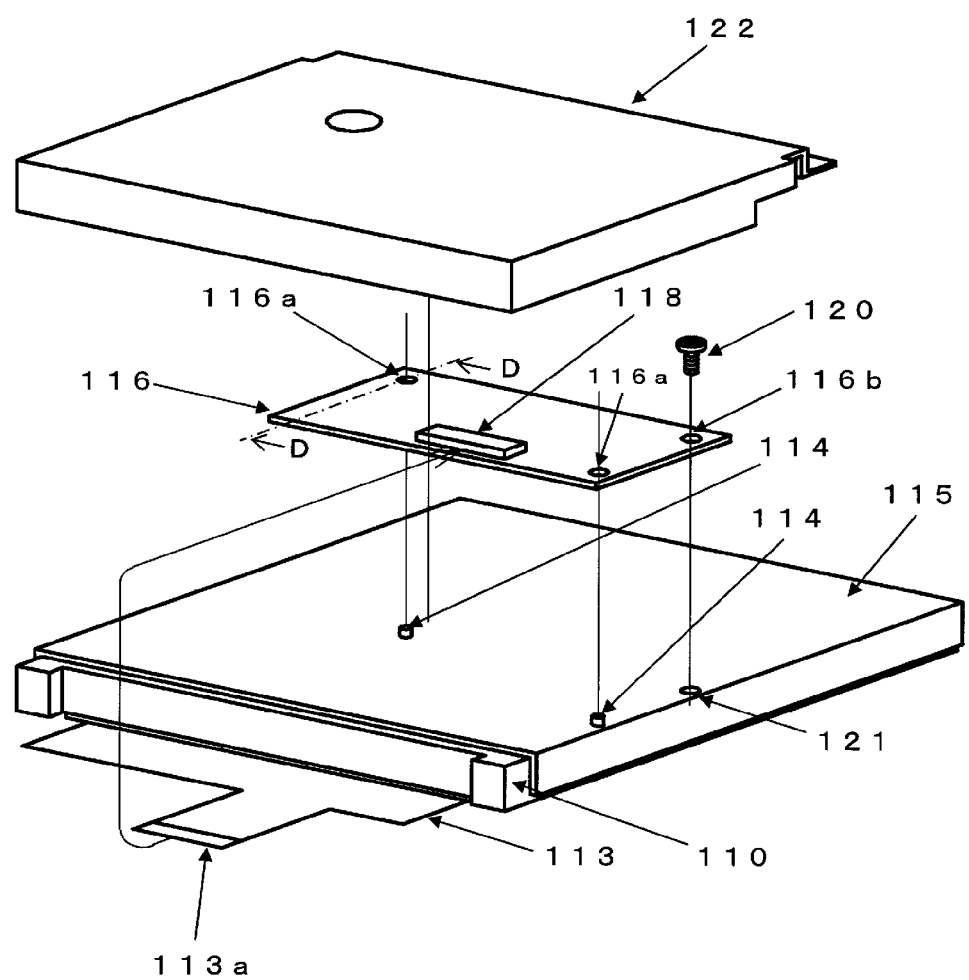
FIG. 8 is an exploded perspective view of a principal part, illustrating a method for attaching a general signal processing substrate in a conventional liquid crystal display device.
Figure 9:
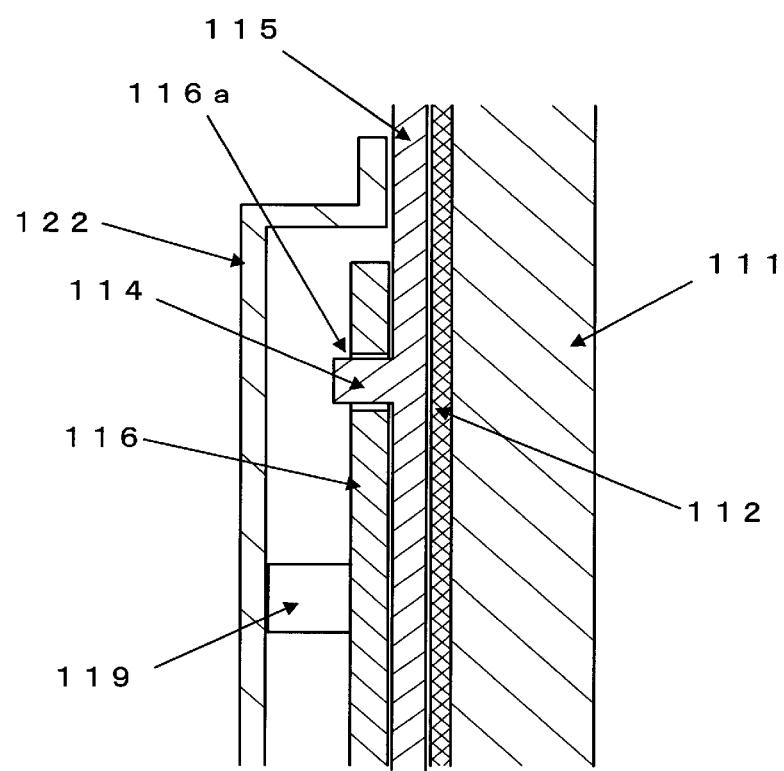
FIG. 9 is a partial cross-sectional view of the conventional liquid crystal display device illustrated in FIG. 8 (assembled state), taken along the line D-D of FIG. 8.

FIG. 6 and FIG. 7 illustrates a liquid crystal display device according to the third embodiment of the present invention.

The liquid crystal display device of the third embodiment differs from the liquid crystal display device of the first embodiment mentioned above in that: (a) two of the end, of a signal processing substrate 16, closer to a rear case 15, and closer to one side wall 10a of a chassis 10 are partially cut out to form cutout portions (voids) 16c having generally rectangular shapes at two places (see FIG. 4 and FIG. 5); (b) two positioning mount components 17 including rectangular metal plates (having circular positioning holes 17a in their centers) are mounted, across each cutout portion 16c, on the signal processing substrate 16 (see FIG. 4 and FIG. 5); (c) generally rectangular protrusions 15a that are approximately fitted to the cutout portions 16c in the end, closer to the rear case 15, of the signal processing substrate 16 are formed on the end, closer to an FPC 13, of the rear case 15 (see FIG. 4 and FIG. 5); (d) generally L-shaped protrusions 15b that are approximately fitted to the cutout portions 16c in the end, closer to the side wall 10a, of the signal processing substrate 16 are formed on a portion extending along the side wall 10a of the chassis 10 from the end, closer to the FPC 13, of the rear case 15 (see FIG. 6); and (e) positioning pins 14b and 14a are formed on the protrusions 15a and 15b of the rear case 15, respectively (see FIG. 6). Thus, the differences are explained below. In the same structure as that of the liquid crystal display device of the first embodiment, the same reference numeral is applied to the same portion, to omit its explanation.

The cutout portion 16c formed by partially cutting out the end, closer to the rear case 15, of the signal processing substrate 16, the positioning mount component 17 mounted, across the cutout portion 16c, on the signal processing substrate 16, and the protrusion 15a of the rear case 15, formed to be approximately fitted to the cutout portion 16c, are the same as those of the second embodiment. The cutout portion 16c formed by partially cutting out the end, closer to the side wall 10a, of the signal processing substrate 16, the positioning mount component 17 mounted, across the cutout portion 16c, on the signal processing substrate 16, and the protrusion 15b of the rear case 15, extending and formed to be approximately fitted to the cutout portion 16c, are also the same as those of the second embodiment except differences in formation positions.

The protrusion 15b has a shape in which the protrusion 15b extends along the side wall 10a of the chassis 10 from the end, closer to the FPC 13, of the rear case 15 and is then bent toward the signal processing substrate 16, as clearly illustrated in FIG. 6. This is because the positioning pin 14a and the threaded hole 21, disposed on the side wall 10a in the first and second embodiments described above, are removed from the side wall 10a to thin the side wall 10a to the minimum.

In other words, the positioning pin 14a is formed on the leading end of the protrusion 15b of the rear case 15 in an internal side from the side wall 10a and is fitted into the positioning hole 17a of the positioning mount component 17 mounted on the signal processing substrate 16 across the cutout portion 16c at a position corresponding to the positioning pin 14a, to thereby position the signal processing substrate 16. In contrast, since the threaded hole 21 is also omitted, the positioned signal processing substrate 16 is not able to be fixed. Thus, as clearly illustrated in FIG. 7, a projection (substrate retainer) 22a, which protrudes inwardly, is disposed on a substrate cover 22, and the signal processing substrate 16 is pressed by the projection 22a, to thereby fix the signal processing substrate 16. In such a manner, the threaded hole 21 and the screw 20 are able to be omitted.

The projection (substrate retainer) 22a of the substrate cover 22 can be easily formed by inwardly dimpling a desired place of the substrate cover 22. The number of such projections 22a may be one or may be two or more.

As mentioned above, in the liquid crystal display device according to the third embodiment of the present invention, the height of the substrate cover 22 with respect to the chassis 10 can be decreased by a level equivalent to the thickness of the rear case 15 by a reason similar to that of the liquid crystal display device according to the first embodiment described above. In addition, the protrusions 15a and 15b of the rear case 15 and the positioning pins 14b and 14a disposed at the corresponding positions, respectively, corresponding to the protrusions 15a and 15b are fitted into the positioning holes 17a, respectively, of the two positioning mount components 17 to automatically position the signal processing substrate 16 at the desired position, and therefore, the accuracy of positioning the signal processing substrate 16 can be secured.

Thus, as in the case of the liquid crystal display device according to the first embodiment described above, there is provided the effect of making it possible to reduce the overall thickness of the liquid crystal module or, in turn, the liquid crystal display device while securing the accuracy of positioning the signal processing substrate 16 without increasing the number of steps of assembling the liquid crystal display device.

Further, there is also provided the effect of eliminating the fear of breaking the positioning mount components 17 in the steps of attaching, storing, and transporting the signal processing substrate 16 since none of the two positioning mount components 17 protrudes from the outer periphery of the signal processing substrate 16, as in the case of the liquid crystal display device according to the second embodiment described above.

Further, since the positioning pin 14a and the threaded hole 21, disposed on the side wall 10a in the first and second embodiments described above, are removed from the side wall 10a, the thickness of the side wall 10a can be reduced to the minimum allowing function as the chassis 10. Therefore, there is also provided the effect of making it possible to further reduce the frame dimension of the whole liquid crystal module.

Alternative Example

The first to third embodiments mentioned above represent the examples in which the present invention is realized. Thus, it will be appreciated that the present invention is not limited to the embodiments but various modifications can be made without deviating from the scope of the present invention.

For example, both shapes of the positioning hole and the positioning pin used for positioning the signal processing substrate 16 are circular in the embodiments mentioned above, but the present invention is not limited thereto. The shapes may also be quadrilateral shapes and other shapes. In addition, the two pairs of the positioning holes and the positioning pins are disposed in the embodiments mentioned above, and three or more pairs thereof may also be disposed.

In addition, the positioning hole and the positioning pin are used for positioning the signal processing substrate 16 in the embodiments mentioned above, but the present invention is not limited thereto. For example, a projection may be used instead of the pin, a depression may be used instead of the hole, and nails engaging with each other may be used.

REFERENCE SIGNS LIST

10 Chassis
10a Side wall
11 Light guide plate
12 Reflection sheet
13 FPC
13a Connection portion of FPC
14a, 14b Positioning pin
15 Rear case
15a, 15b Protrusion of rear case
16 Signal processing substrate
16a Positioning hole of signal processing substrate
16b Threaded insertion hole of signal processing substrate
16c Cutout portion of signal processing substrate
17 Positioning mount component
17a Positioning hole of positioning mount component
17b Solder portion of positioning mount component
18 Connector
19 Electrical mount component
20 Screw
21 Threaded hole
22 Substrate cover
22a Projection (substrate retainer) of substrate cover

The invention claimed is:

1. A liquid crystal display device comprising:
a chassis in which a liquid crystal panel and a reflection sheet are placed;
a rear case attached to a back face of the chassis in a state in which a part of the reflection sheet is exposed;
a signal processing substrate that is placed on the reflection sheet exposed from the rear case and that is used for driving the liquid crystal panel; and
one or two or more positioning mount plates which are mounted on the signal processing substrate; wherein:
one or two or more locking portions configured to lock the positioning mount plates are formed at positions corresponding to the positioning mount plates in the rear case; and
the positioning mount plates are locked at the corresponding locking portions to thereby position the signal processing substrate at a desired position on the reflection sheet.

2. The liquid crystal display device according to claim 1, wherein parts of the positioning mount plates protrude along the signal processing substrate from an outer periphery of the signal processing substrate, the protruding parts of the positioning mount plates overlap the rear case, and the positioning mount plates are locked at the corresponding locking portions in places in which the protruding parts overlap the rear case.

3. The liquid crystal display device according to claim 1, wherein the positioning mount plates are placed in an internal side from an outer periphery of the signal processing substrate, a protrusion of the rear case overlaps the signal processing substrate in the internal side from the outer periphery of the signal processing substrate, and the positioning mount plates are locked at the corresponding locking portions in a place in which the protrusion of the rear case overlaps the signal processing substrate.

4. The liquid crystal display device according to claim 1, wherein the positioning mount plates comprise plates in which positioning holes are formed, and the locking portions comprise pins or projections configured to be fitted into the positioning holes.

5. The liquid crystal display device according to claim 1, wherein the positioning mount plates comprise metallic plates, in which positioning holes are formed, and are mounted on the signal processing substrate by soldering or adhesive bonding.

6. The liquid crystal display device according to claim 2, wherein the positioning mount plates are mounted across a gap between the signal processing substrate and the rear case.

7. The liquid crystal display device according to claim 3, wherein the positioning mount plates are mounted across a cutout portion formed in the signal processing substrate.

8. The liquid crystal display device according to claim 1, wherein:
one of the locking portions formed in the rear case is formed in a first protrusion formed in the rear case,
other one of the locking portions formed in the rear case is formed in a second protrusion formed in the rear case, and
the second protrusion comprises a part extending along a side wall of the chassis.

9. The liquid crystal display device according to claim 1, further comprising a substrate cover comprising an inwardly protruding projection,
wherein the substrate cover is configured to press the positioned signal processing substrate with the projection, whereby the signal processing substrate is fixed without using any screw.

* * * * *